March 17, 1942.　　　　L. PELTIER　　　　2,276,792
COMBINED BABY WALKER AND STROLLER
Filed April 11, 1940　　　3 Sheets-Sheet 1

Inventor
Leslie Peltier
By
W. S. McDowell
Attorney

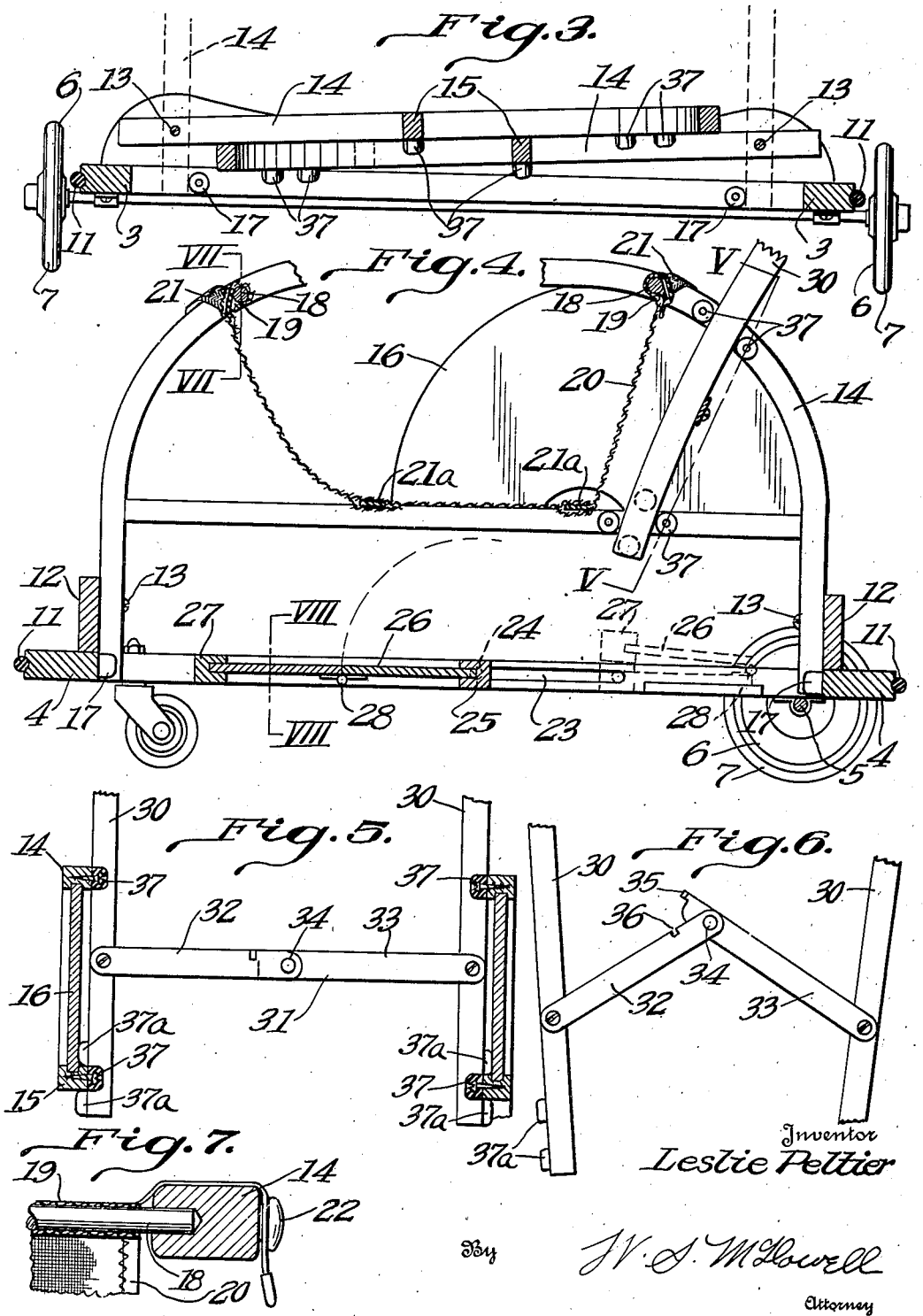

March 17, 1942.    L. PELTIER    2,276,792
COMBINED BABY WALKER AND STROLLER
Filed April 11, 1940    3 Sheets-Sheet 3
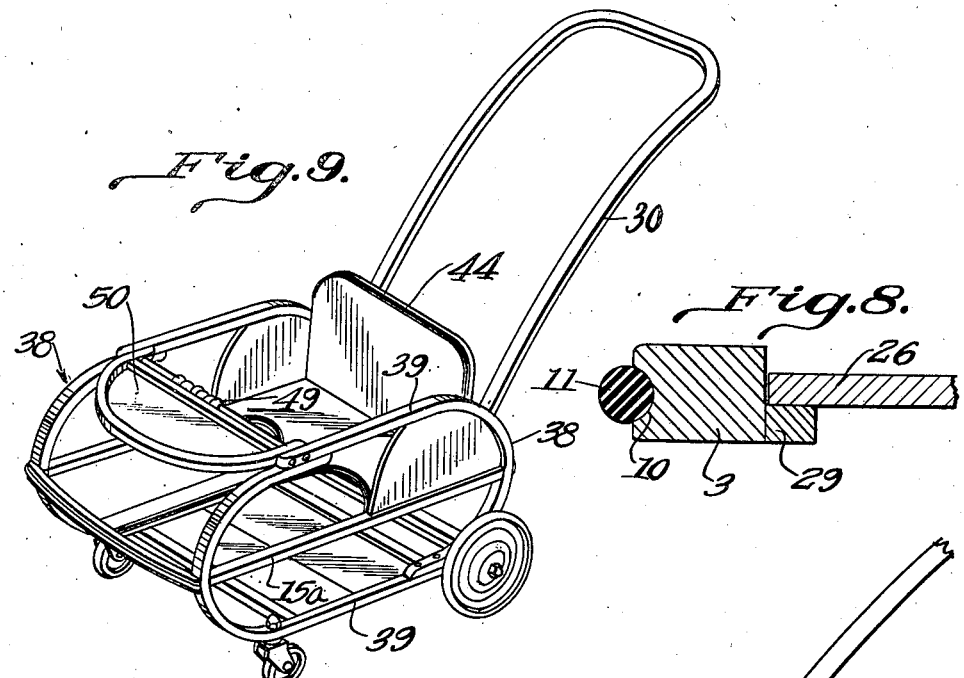
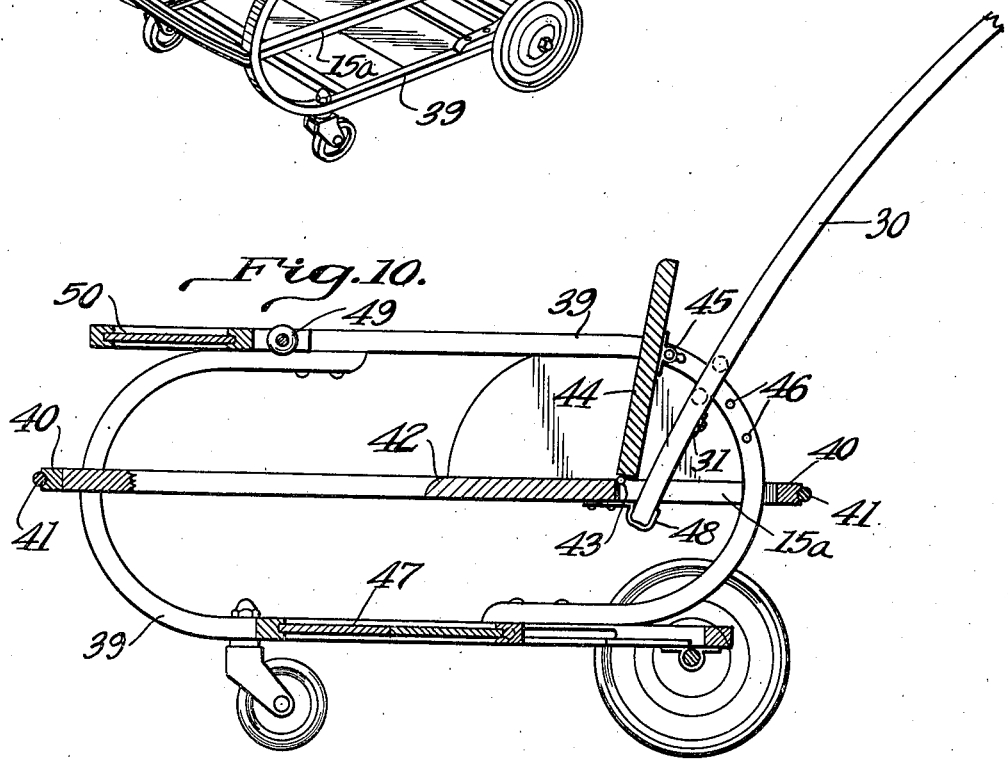
Inventor
Leslie Peltier
By H. S. McDowell
Attorney Patented Mar. 17, 1942

2,276,792

UNITED STATES PATENT OFFICE 2,276,792

COMBINED BABY WALKER AND STROLLER

Leslie Peltier, Delphos, Ohio, assignor to The Delphos Bending Company, Delphos, Ohio, a corporation of Ohio Application April 11, 1940, Serial No. 329,139

5 Claims. (Cl. 155—22)

This invention relates generally to juvenile furniture and is particularly directed to a combined baby walker and stroller.

The primary purpose of the invention resides in the provision of a piece of furniture which may be converted from a child's walker to a stroller.

Another purpose resides in the provision of a device of the character set forth in which a chassis frame is provided having a plurality of upwardly directed side frames between which is supported a seat mechanism. Below the seat mechanism, a foot board is provided which may be collapsed to an inoperative position when the device is converted from a stroller to a walker.

Another object resides in pivotally securing the spaced side members to the chassis frame in such manner that they may be folded to a position substantially parallel with the chassis frame in order to provide a compact bundle requiring but a minimum of space during storage and shipping.

Another object resides in providing a device of the character mentioned in which the back rest of the seat may be tilted to permit the infant using the device to assume a reclining position.

A still further object resides in providing the front and rear portions of the device with resilient bumper means to protect other articles of furniture from injury when engaged by the device when used in the capacity of a walker.

It is also an object to provide novel handle means which may be collapsed and removed from the stroller without the use of tools, screws or other fastening devices.

Another object rests in providing a combined walker and stroller having a chassis frame with pivoted side members and further providing the frame with resilient means for limiting the degree of pivotal movement of the side members, means being removably positioned between the side members to prevent the collapse or movement thereof to a folded position, the last-named means also serving as a support for a flexible fabric element which functions as a seat for the user of the device. Flexible means are also provided with the fabric element for detachable engagement with the side frames to prevent movement thereof to a position wherein the seat supporting elements will be released.

Other objects will be apparent from the following description and the accompanying drawings in which several forms of the combined walker and stroller have been illustrated in detail.

Fig. 3 is a vertical transverse sectional view showing the side frames in collapsed positions;

Fig. 4 is a vertical longitudinal sectional view taken through the device, this view showing the foot board in an operative position in full lines and in a collapsed inoperative position in dotted lines;

Fig. 5 is a detail vertical sectional view taken on the plane indicated by the line V—V of Fig. 4, and showing the handle operatively positioned in engagement with the side frames of the device;

Fig. 6 is a front elevational view of the lower portion of the handle showing it in a collapsed position;

Fig. 7 is a detail vertical sectional view taken on the plane indicated by the line VII—VII of Fig. 4;

Fig. 8 is an enlarged detail sectional view taken on the plane indicated by the line VIII—VIII of Fig. 4;

Fig. 9 is a perspective view showing a modified form of the device;

Fig. 10 is a vertical longitudinal sectional view taken through the device shown in Fig. 9.

Figure 1:
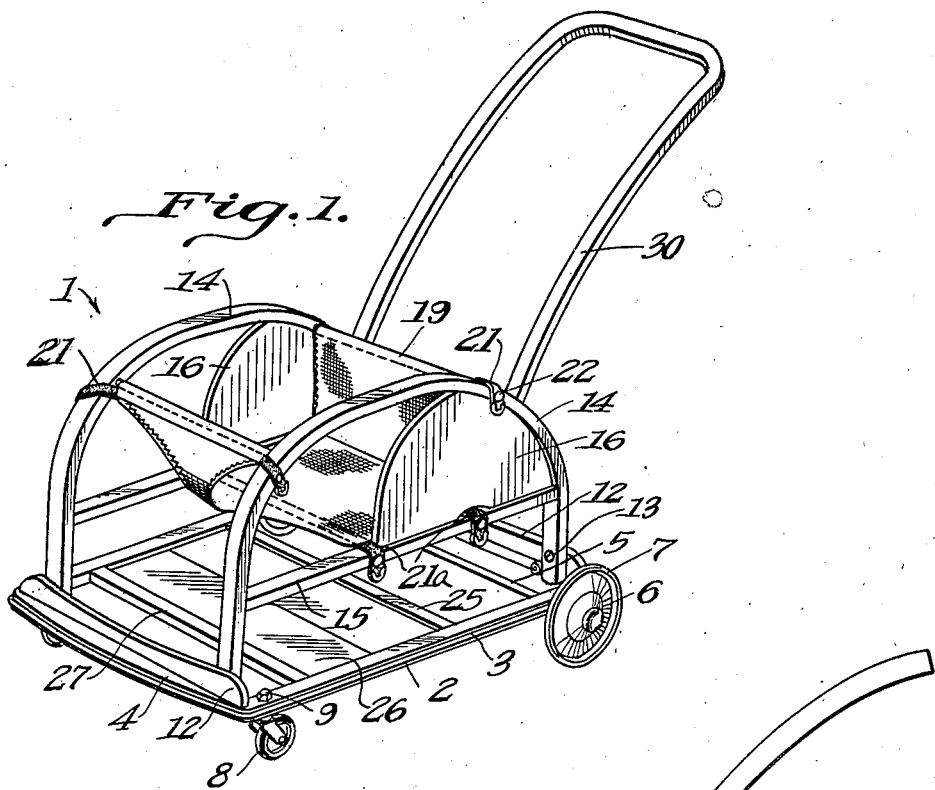
Fig. 1 is a perspective view of a combined walker and stroller formed in accordance with the present invention.
Figure 2:
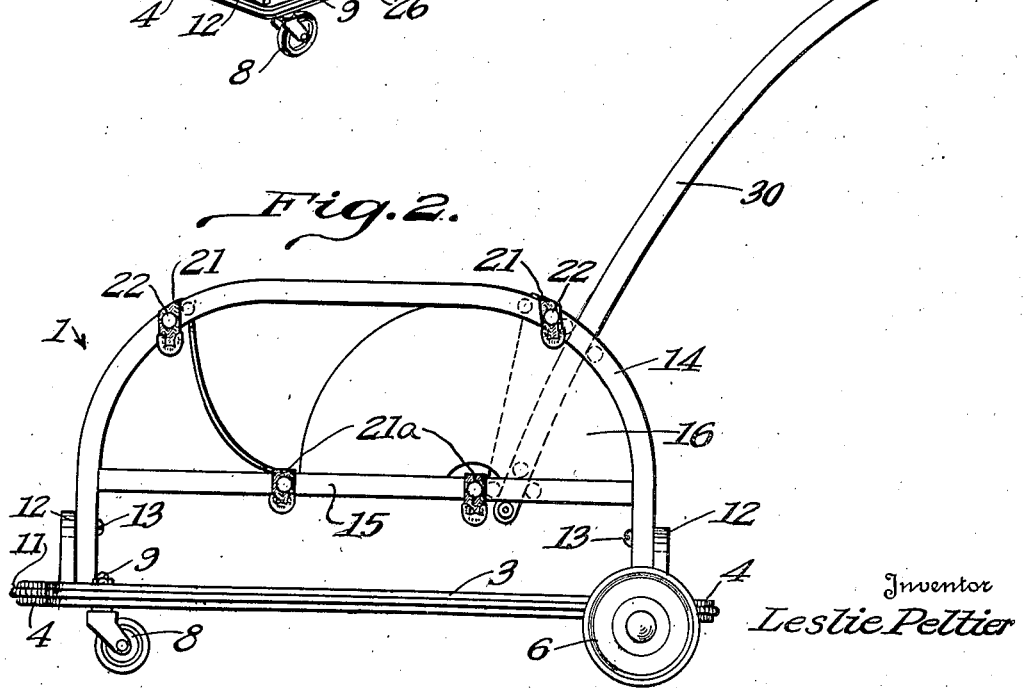
Fig. 2 is a side elevational view of the device shown in Fig. 1.

Referring more particularly to the drawings, the numeral 1 designates the combined baby walker and stroller in its entirety. This device is preferably made of bent wood materials but the construction thereof readily lends itself to the formation of the device from other materials such as strap or bar iron. The stroller 1 includes a chassis frame 2 formed of a plurality of longitudinally and transversely extending rails 3 and 4, the latter being connected with the former at the ends to form a rigid rectangular structure. Adjacent the rear end of the chassis frame, there is provided a transversely extending axle 5, the ends of which support enlarged ground engaging wheels 6, the latter being provided with rubber tires 7 to facilitate the movement of the device over hard surfaces and to absorb jars or bumps when the device is rolled over obstructions. The forward end of the chassis frame is provided with casters 8, which are secured to the frame by having threaded shanks extending through the rails 3 and secured therein by cap nuts 9.

The outer edges of the rails 3 and 4 are recessed as at 10 to receive an elongated cylindrical strip of rubber 11 which serves as a bumper to absorb shocks when the chassis frame is moved into engagement with walls or other obstructions. Secured to each of the rails 4 and coextensive therewith is a vertically arranged bar 12, the upper edge of which is curved to enhance the appearance of the device. These rails receive screws 13 employed in pivotally securing inverted U-shaped side frames 14 to the chassis frame. The side frames are each provided intermediate of the height with a longitudinally extending brace 15, the purpose of which will be hereinafter set forth. The U-shaped portion of each side frame is recessed as is the bar 15 carried thereby to receive a side plate 16 used in closing the rear portion of the side frame.

As illustrated in Fig. 3, the side frames may be rocked about the screws 13 from positions substantially parallel with the chassis frame to vertical positions wherein the lower ends of the U-shaped members will engage with rubber stop members 17 secured to the inner surfaces of the transversely extending rails 4. After the lower ends of the side frames engage the stop members, a slight additional movement toward the sides is possible to enable the ends of round bars 18 to be positioned within sockets formed on the inner sides of the U-shaped members adjacent their upper ends. When the outward force is released on the members 14, the resiliency of the stops 17 will cause these members to move into positions where the rods 18 will be held under a slight compressive force. These rods prevent further inward movement of the members 14 and the collapse of the side frames, length of the rods being such as to hold the members 14 in firm engagement with the stops 17.

Prior to inserting the rods in the sockets, the former are passed through casings 19 formed at the ends of a fabric sheet 20 which serves in the capacity of a seat for the user of the device. This sheet is also provided at its ends with transversely extending tape members 21, the ends of which are provided with the female portions 22 of snap fasteners, the male portions of which are secured to the outer surfaces of the frames 14 adjacent points in registration with the sockets on the inner surface. After the bars have been positioned in the sockets, the end portions of the straps may be passed over the upper edges of the side frames 14 and secured to the outer surfaces thereof through the use of the snap fasteners. When the straps are thus connected with the side frames, they cooperate with the stop members to prevent outward movement of the side frames to positions wherein the bars 18 might be released.

To further secure the seat forming sheet 20 to the side frames, the intermediate portions thereof are provided with transversely extending straps 21a, the end portions of which also have the female parts of snap fasteners carried thereby, these being engaged with the male portions which are secured to the outer surfaces of the brace bars 15. The plates 16 are provided adjacent their lower edges with openings to permit the rearmost strap 21 to be passed over the brace bar 15 and engaged with the snap fastener on the outer surface adjacent the opening.

Between its forward end and intermediate portion, the sheet 20 is reduced in width to provide a narrow strap-like portion which extends from the foremost strap 21 to the casing 19 and assists in supporting the weight of the child using the device. By reducing the width of the sheet, curved recesses are provided to receive the child's legs and prevent the seat from chafing or otherwise irritating the infant's legs. Inasmuch as the sheet is of fabric, this strap portion may be readily collapsed to further decrease the tendency to irritate the infant's legs.

As indicated at 23 in Fig. 4, the inner sides of the longitudinally extending rails 3 are provided with elongated channels for the reception of pins 24 provided at the ends of a transversely extending bar 25 forming a portion of a foot-receiving platform 26. A second bar 27 similar to the bar 25 is provided at the forward edge of the platform, the front and rear edges of the platform being disposed within slots formed in the bars 25 and 27. The platform 26 is formed from a pair of sections hingedly joined as at 28 and supported in their active positions by cleats 29 secured to the inner surfaces of the rails 3 in vertical registration with the forward edge of the seat.

The bar 27 has no positive connection with the rails 3 and when it is desired to convert the device from a stroller to a walker, the platform may be collapsed by folding the sections about the hinge 28, after which the platform may be moved longitudinally of the chassis frame to a rearwardly disposed position as indicated by dotted lines in Fig. 4. When the platform is thus positioned, a child may engage the floor with its feet and propel the walker over the floor by movement of its legs. Due to the positioning of the platform, considerable movement of the child's feet is possible without engaging the platform. If it is desired to completely remove the platform, one end thereof may be moved longitudinally in the slot 23 to disengage the pins 24 from the rails 3 after which the platform may be withdrawn from the chassis frame.

To facilitate the movement of the device when it is used as a stroller, a handle 30 has been provided. This handle includes a U-shaped member formed from bent wood or a metal bar and has spaced lower ends. Due to the formation of the handle, the ends may be slightly flexed to position the outer edges in firm engagement with the side frames 14. To permit this flexing of the handle ends, a jackknife brace 31 is secured to the handle adjacent its lower end. This brace includes a pair of strips 32 and 33 having pivotal connections with the spaced lower ends of the handles, the free ends of the strips being pivotally connected as at 34. The strip 33 extends a slight distance beyond the pivotal connection 34 and is provided with a laterally directed finger 35 which enters a slot 36 when the brace is fully extended to limit the pivotal movement of the strips. To facilitate the positioning of the handle in connection with the frames 14, the latter are provided on their inner sides adjacent the rear portion with spaced rubber buttons 37. A pair of buttons are secured to the upper portion of each frame 14 and to the inner side of each brace bar 15. The spaced lower ends of the handle are also provided with buttons 37a adjacent the lower extremities.

When the handle is to be attached to the side frames, the buttons 37a are positioned above and below the bars 15 with the handle ends in registration with the space between the buttons 37 and the jackknife brace is then moved to an extended position which movement will force the ends of the handle into firm engagement with the side frames. The jackknife brace may be readily operated by the foot of the user. A slight upward pressure is sufficient to collapse the brace when the handle is being disconnected and a slight downward pressure serves to spread the handle ends when the handle is being attached to the device.

If it is desired to reduce the cost of the device, the brace bars 15, panels 16 and straps 21a may be eliminated. The occupant would then be supported merely by the transversely extending bars 18, the sheet 20 serving as a hammock or swing.

In the modified form of the invention shown in Figs. 9 and 10, the device is not collapsible, the side frames 38 being rigidly connected and serving as a combined body and chassis. These side frames are composed of substantially J-shaped members 39, the longer end of each being connected with the shorter end of the other. These members are disposed in vertical positions and are connected at the front and rear portions with transversely extending curved rails 40 which have their outer sides recessed to receive the flexible bumper strips 41. The rails 40, like the rails 4, are disposed beyond the ground engaging wheels so that when the device approaches an obstruction, the flexible elements will engage therewith and prevent further movement toward the obstruction.

This form of the invention also has horizontally extending brace bars 15a forming a part of the side frames and serving as a support for a rigid seat element 42. This seat has an extension adjacent its central portion which projects forwardly and engages with the transversely extending rail 40 at the front end of the device. The rear edge of the seat has a hinge mechanism 43 secured thereto which serves to pivotally connect a back rest 44 to the seat. The back rest may be supported in its positions of adjustment by latch members 45 disposed for registration with sockets 46 formed in the members 39. This modified form of walker and stroller shown in Figs. 9 and 10 is also provided with a collapsible foot rest 47 conforming substantially to the foot rest in the preferred form of the invention. The foot rest 47 may be moved to an inactive position when the device is converted from a stroller to a walker.

A removable handle is employed in the modified form of invention, the handle being substantially identical with the handle 30. A slightly different means 48 is provided to locate the handle on the modified form of walker, this means consisting of a pair of metallic strips which are secured to the under side of the seat and have U-shaped recesses formed at one end. These recesses receive the lower ends of the handle. The jackknife brace 31 is provided on the handle to spread the lower end portions when the handle is being connected to the side frames.

Suitable ornamental and amusement devices 49 may be provided between the side members in advance of the seat to catch the child's attention and render the device attractive. In the modified form, a tray 50 is secured between the side frames, the tray serving to prevent the occupant from falling forward out of the seat.

While a combined walker and stroller has been illustrated in several forms, it is obvious that many minor changes may be made in the construction and relation of parts without departing from the spirit and scope of the invention as set forth in the following claims.

What is claimed is:

1. In a combination walker and stroller for babies, a wheeled chassis frame, a pair of side members pivotally secured to said chassis for movement between horizontal positions over said body and upright positions thereon, stop means engaged by said side members after they have reached their upright positions, said means permitting slight additional movement of said side members after engagement therewith, spacer bars removably positioned between said side members when the same have moved in opposition to said stop means, a flexible seat supported by said spacer bars, strap means formed with said seat and provided with means detachably securing said strap means to said side members to prevent accidental release of said bars.

2. In a combination baby walker and stroller, a horizontally disposed chassis frame, ground engaging wheels carried by said frame, inverted U-shaped side members pivotally connected adjacent the lower ends thereof to the front and rear portions of said chassis frame, horizontally extending brace bars carried intermediate the height of said side members, said side members being movable from active vertical positions to inactive substantially horizontal positions, resilient stop means provided on said chassis to yieldably resist movement of said side members beyond active positions, spacer bars removably engaged with the upper end portions of said side members, fabric seat means supported by said spacer bars, and flexible strap means forming a part of said seat means and removably connected with said side members to prevent separation of said spacer bars and side members.

3. In a combination baby walker and stroller, a horizontal frame having longitudinally extending slotted side bars, a foot board carried by said frame, said foot board comprising a plurality of sections, hinge means connecting said foot board sections, pivot means connecting one end of said foot board to said frame, said pivot means being disposed in the slots in said side bars whereby said foot board sections may be folded relative to one another and said frame and moved lengthwise of said frame after being folded, and means on said frame for supporting the free end of said foot board in either folded or unfolded conditions.

4. In a combination baby walker and stroller, a horizontally disposed chassis frame, ground engaging wheels carried by said frame, inverted U-shaped side members pivotally connected adjacent the lower ends thereof to the front and rear portions of said chassis frame, horizontally extending brace bars carried intermediate the height of said side members, said side members being movable from active vertical positions to inactive substantially horizontal positions, resilient stop means provided on said chassis to yieldably resist movement of said side members beyond active positions, spacer bars removably engaged with the upper end portions of said side members, a seat member formed from a fabric sheet and having casings at either end for the reception of said spacer bars, and strap means carried at the end and intermediate portions of said seat member, the end and intermediate straps being passed over and secured to the upper and brace bars respectively of said side members to prevent separation of said spacer bars from said side members and effect the support of said seat.

5. In a combination walker and stroller for babies, a substantially horizontal frame, a pair of unitary side members having sockets formed therein, said side members being pivotally connected adjacent to their lower ends to said frame, resilient stop means disposed on said frame below the pivots for said side members, the latter being movable from horizontal positions over said frame to upright positions at substantially right angles thereto, the upper ends of said side members being movable away from one another a slight degree after the lower ends have engaged said stop means, spacer rods removably received by the sockets when the upper ends of said side members are moved away from one another, flexible seat means supported by said spacer rods, and strap means provided on said seat for attachment to said side members to prevent separation thereof after said bars have been positioned in said sockets.

LESLIE PELTIER.